United States Patent
Kawabata et al.

(10) Patent No.: US 7,539,712 B2
(45) Date of Patent: May 26, 2009

(54) PROGRAM, PROGRAM CONSTRUCTION METHOD, STORAGE MEDIUM, PROGRAM CONSTRUCTION SYSTEM, AND TERMINAL DEVICE

(75) Inventors: Isami Kawabata, Tokyo (JP); Hidekazu Kikuchi, Tokyo (JP); Ryutaro Asari, Tokyo (JP); Motoyuki Osugi, Tokyo (JP); Sunao Tomita, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 10/879,182

(22) Filed: Jun. 30, 2004

(65) Prior Publication Data

US 2005/0182744 A1 Aug. 18, 2005

(30) Foreign Application Priority Data

Feb. 18, 2004 (JP) ............................. 2004-041997

(51) Int. Cl.
*G06F 12/00* (2006.01)
*G06F 17/30* (2006.01)
*G06F 9/44* (2006.01)

(52) U.S. Cl. ..................... 707/205; 717/106; 717/168

(58) Field of Classification Search ................... None
See application file for complete search history.

(56) References Cited

U.S. PATENT DOCUMENTS

| 2003/0131001 | A1* | 7/2003 | Matsuo | 707/9 |
|---|---|---|---|---|
| 2003/0154183 | A1* | 8/2003 | Warren | 707/1 |
| 2003/0208456 | A1* | 11/2003 | Greenstein | 707/1 |
| 2005/0091651 | A1* | 4/2005 | Curtis et al. | 717/168 |
| 2006/0026105 | A1* | 2/2006 | Endoh | 705/59 |
| 2007/0169073 | A1* | 7/2007 | O'Neill et al. | 717/168 |

FOREIGN PATENT DOCUMENTS

JP 10-222357 8/1998

* cited by examiner

*Primary Examiner*—Neveen Abel Jalil
*Assistant Examiner*—Raheem Hoffler
(74) *Attorney, Agent, or Firm*—Staas & Halsey LLP

(57) ABSTRACT

An information processing system which constructs a program by combining a plurality of functional units, has an information table for management of components, etc. each of which is a functional unit of a program, and the information table stores plural pieces of management information for individual management of the use record of each component so that the information can be referred to as the reference of reliability when the component is reused, and the management information can be sequentially updated based on the actual use record.

6 Claims, 17 Drawing Sheets

FIG. 3A

REUSABLE COMPONENT REPOSITORY - EXAMPLE OF METHOD INFORMATION

| METHOD ID | METHOD NAME | COMPONENT ID | PARAMETER | ...... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|---|---|---|
| GRADEPOINTCAL | CALCULATING EVALUATION POINT | EMP0120GRD | YAK, G1, G2, ... | ...... | 7 | 5 | 3 | 5/7=71.4 | 3/7=42.9 |
| GRADEPOINTCHK | EVALUATION POINT CHECK | EMP0120GRD | POINT | ...... | 6 | 6 | 4 | 6/6=100 | 4/6=66.7 |

FIG. 3B

REUSABLE COMPONENT REPOSITORY - EXAMPLE OF COMPONENT INFORMATION

| COMPONENT ID | COMPONENT NAME | COMPONENT TYPE | ...... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|---|---|
| EMP0120GRD | OBTAINING EVALUATION POINT | EMPLOYEE MAINTENANCE | ...... | 10 | 8 | 7 | 8/10=80 | 7/10=70 |
| EMP0130SCH | EMPLOYEE RETRIEVAL | EMPLOYEE MAINTENANCE | ...... | 35 | 27 | 8 | 27/35=77.1 | 8/35=22.9 |

FIG. 4A

EXAMPLE OF BASIC SCREEN INFORMATION 21

| SCREEN ID | SCREEN NAME | SCREEN CONFIGURATION |
|---|---|---|
| TKY01001 | EMPLOYEE MASTER MAINTENANCE | CARD UNIT ONLY |
| TKY01002 | LIST OF EMPLOYEES | CARD UNIT DETAIL PORTION |

EXAMPLE OF SCREEN INPUT/OUTPUT ITEM ATTRIBUTE INFORMATION 22

| SCREEN ID | ITEM ID | ITEM NAME | TYPE | DATA TYPE | ・・・・ |
|---|---|---|---|---|---|
| TKY01001 | EMPNAME | EMPLOYEE NAME | INPUT | CHARACTER STRING | ・・・・ |
| TKY01001 | BIRTHYMD | BIRTHDAY | INPUT | DATE | ・・・・ |
| : | : | : | : | : | : |
| TKY01001 | GRADE_Q4 | EVALUATION OF FOURTH QUARTER | INPUT | VALUE | ・・・・ |
| TKY01001 | BTNGRADE | CALCULATING EVALUATION POINT | COMMAND | | ・・・・ |
| TKY01001 | BTNENTER | INPUT COMPLETION BUTTON | COMMAND | | ・・・・ |

EXAMPLE OF SCREEN ACTION INFORMATION 23

| SCREEN ID | ITEM ID | ACTION TYPE | ・・・・ |
|---|---|---|---|
| TKY01001 | BTNGRADE | COMPONENT CALL | ・・・・ |
| TKY01001 | LNKPOSTNUM | COMPONENT CALL | ・・・・ |
| TKY01001 | BTNENTER | DATA TRANSMISSION | ・・・・ |

EXAMPLE OF ACTION COMPONENT INFORMATION 24

| SCREEN ID | ITEM ID | METHOD ID | METHOD NAME | SETTING SECTION | ・・・・ |
|---|---|---|---|---|---|
| TKY01001 | BTNGRADE | GRADEPOINTCAL | CALCULATING EVALUATION POINT | EXTRACTION | ・・・・ |
| TKY01001 | BTNGRADE | GRADEPOINTCHK | EVALUATION POINT CHECK | EXTRACTION | ・・・・ |
| TKY01001 | LNKPOSTNUM | POSTNUMSCH | POSTCODE RETRIEVAL | NEW ENTRY | ・・・・ |

24a  24b  24c  24d  24e

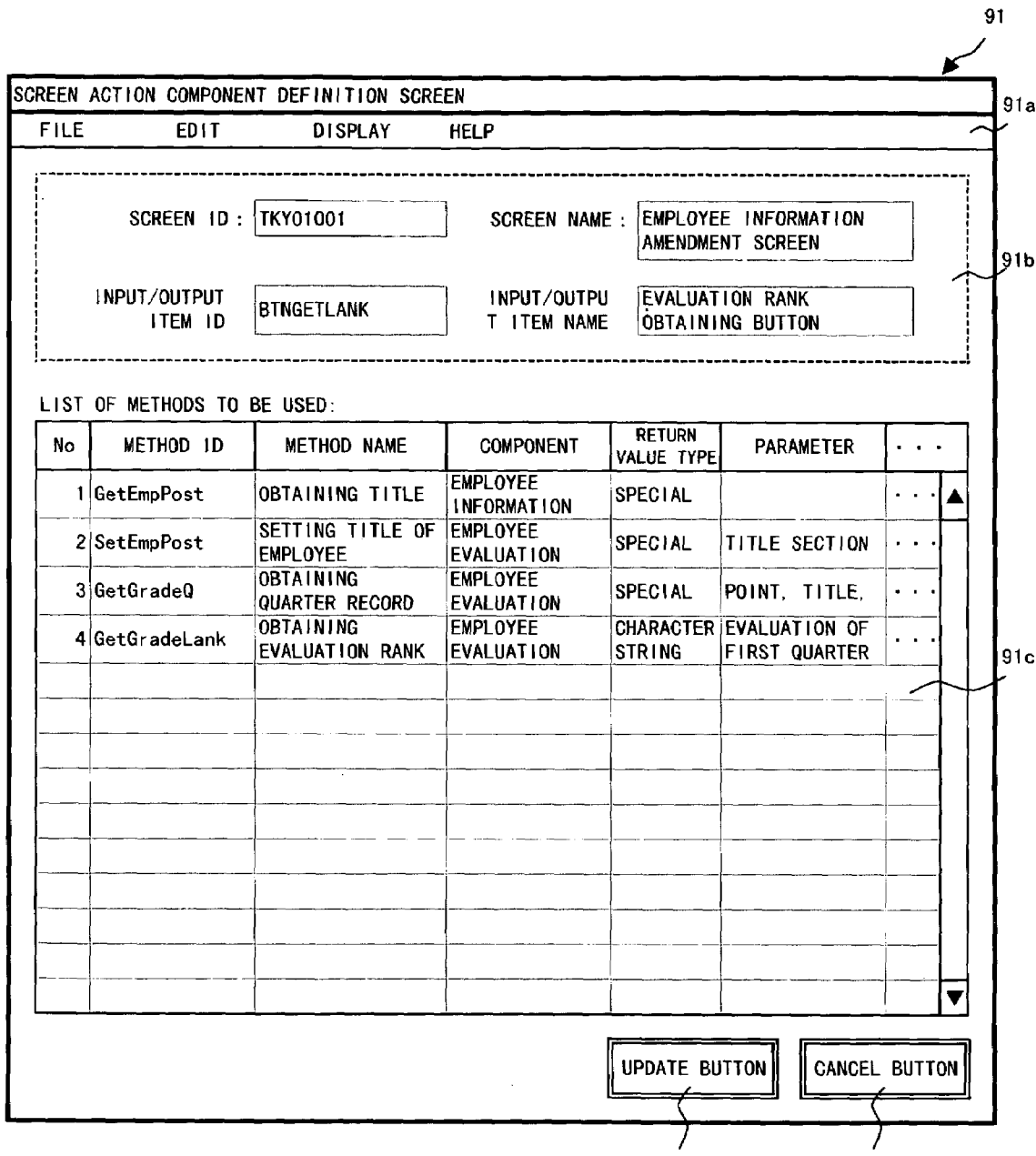
F I G. 5

COMPONENT RETRIEVAL SCREEN

☑ KEYWORD : RETRIEVAL FROM AMONG ID, NAME, TYPE, SPECIFICATION, EXPLANATION, AUTHOR, PROVIDER, APPLICATION NAME, PARAMETER, RETURN VALUE TYPE, REMARKS

RECORD MANAGEMENT SYSTEM    EVALUATION    FUJITSU

☑ GENERATION DATE :                    ☑ DIVERTED USE FREQUENCY :

● PAST [6] MONTH           FREQUENCY OF ACTION SETTING        OVER [50] TIMES
○ PAST [ ] DAYS            AUTOMATIC PROGRAM GENERATION RATE  OVER [50] %
○ DESIGNATION OF DATE [ / / ] ~ [ / / ]   OPERATION ENVIRONMENT ARRANGEMENT RATE  OVER [50] %

[RETRIEVAL]

LIST OF RETRIEVAL RESULTS :

| METHOD ID | METHOD NAME | COMPONENT | DIVERTED USE FREQUENCY ||| |
|---|---|---|---|---|---|---|
| | | | USE (TIMES) | AUTOMATIC GENERATION (%) | OPERATION ENVIRONMENT ARRANGEMENT (%) | · · · |
| GetGradeLank | OBTAINING EVALUATION RANK | EMPLOYEE EVALUATION | 202 | 98.26 | 90.45 | · · · |
| GetGradeQ | OBTAINING QUARTER RECORD | EMPLOYEE EVALUATION | 121 | 83.21 | 81.12 | · · · |
| SetEmpPost | SETTING EMPLOYEE TITLE | EMPLOYEE EVALUATION | 74 | 92 | 76.2 | · · · |
| Shonin | EVALUATOR APPROVAL | APPROVING RECORD | 51 | 52.52 | 51.01 | · · · |

[SELECT]  [CANCEL]

F I G. 6

FIG. 10A (EXAMPLE 1) WHEN ONE METHOD IS DEFINED IN ONE COMPONENT FOR ACTION OF ONE ITEM ON SCREEN

ACTION COMPONENT INFORMATION

| SCREEN ID | ITEM ID | METHOD ID | METHOD NAME | SETTING SECTION | ... |
|---|---|---|---|---|---|
| TKY01001 | BTNGRADE | GRADEPOINTCAL | CALCULATING EVALUATION POINT | EXTRACTION | ... |
| TKY01001 | LNKPOSTNUM | POSTNUMSCH | RETRIEVING POSTCODE | NEW ENTRY | ... |

(24 → SETTING SECTION column)

FIG. 10B

S4 — AFTER NORMAL TERMINATION OF PROCESS

METHOD INFORMATION

| METHOD ID | ... | FREQUENCY OF USE | ... | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|---|
| GRADEPOINTCAL | ... | 7+1=8 | ... | 5 | 3 | 5/8=62.5 | 3/8=37.5 |
| GRADEPOINTCHK | ... | 6 | ... | 6 | 4 | 6/6=100 | 66.7 |

(11 → AUTOMATIC GENERATION RATE column)

COMPONENT INFORMATION

| COMPONENT ID | ... | FREQUENCY OF USE | ... | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|---|
| EMP0120GRD | ... | 10+1=11 | ... | 8 | 7 | 8/11=72.7 | 7/11=63.6 |
| EMP0130SCH | ... | 35 | ... | 27 | 8 | 27/35=77.1 | 22.9 |

(12 → AUTOMATIC GENERATION RATE column)

FIG. 10C

S6 - AFTER NORMAL TERMINATION OF PROCESS
METHOD INFORMATION

| METHOD ID | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|
| GRADEPOINTCAL | ..... | 8 | 5+1=6 | 3 | 6/8=75 | 37.5 |
| GRADEPOINTCHK | ..... | 6 | 6 | 4 | 100 | 66.7 |

COMPONENT INFORMATION

| COMPONENT ID | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|
| EMP0120GRD | ..... | 11 | 8+1=9 | 7 | 9/11=81.8 | 63.6 |
| EMP0130SCH | ..... | 35 | 27 | 8 | 77.1 | 22.9 |

FIG. 10D

S7 - AFTER NORMAL TERMINATION OF PROCESS
METHOD INFORMATION

| METHOD ID | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|
| GRADEPOINTCAL | ..... | 8 | 6 | 3+1=4 | 75 | 4/8=50 |
| GRADEPOINTCHK | ..... | 6 | 6 | 4 | 100 | 66.7 |

COMPONENT INFORMATION

| COMPONENT ID | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|
| EMP0120GRD | ..... | 11 | 9 | 7+1=8 | 81.8 | 8/11=72.7 |
| EMP0130SCH | ..... | 35 | 27 | 8 | 77.1 | 22.9 |

FIG. 11A (EXAMPLE 2) WHEN TWO METHODS ARE DEFINED IN ONE COMPONENT FOR ACTION OF ONE ITEM ON SCREEN
ACTION COMPONENT INFORMATION

| SCREEN ID | ITEM ID | METHOD ID | METHOD NAME | SETTING SECTION 24 |
|---|---|---|---|---|
| TKYO1001 | BTNGRADE | GRADEPOINTCAL | CALCULATING EVALUATION POINT | EXTRACTION ⋯⋯ |
| TKYO1001 | BTNGRADE | GRADEPOINTCHK | EVALUATION POINT CHECK | EXTRACTION ⋯⋯ |
| TKYO1001 | LNKPOSTNUM | POSTNUMSCH | RETRIEVING POSTCODE | NEW ENTRY ⋯⋯ |

FIG. 11B

S4 - AFTER NORMAL TERMINATION OF PROCESS
METHOD INFORMATION

| METHOD ID | ⋯⋯ | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) | 11 |
|---|---|---|---|---|---|---|---|
| GRADEPOINTCAL | ⋯⋯ | 7+1=8 | 5 | 3 | 5/8=62.5 | 3/8=37.5 | |
| GRADEPOINTCHK | ⋯⋯ | 6+1=7 | 6 | 4 | 6/7=85.7 | 4/7=57.1 | |

COMPONENT INFORMATION

| COMPONENT ID | ⋯⋯ | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) | 12 |
|---|---|---|---|---|---|---|---|
| EMP0120GRD | ⋯⋯ | 10+1=11 | 8 | 7 | 8/11=72.7 | 7/11=63.6 | |
| EMP0130SCH | ⋯⋯ | 35 | 27 | 8 | 27/35=77.1 | 22.9 | |

FIG. 11C

S6 - AFTER NORMAL TERMINATION OF PROCESS
METHOD INFORMATION

| METHOD ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| GRADEPOINTCAL | ... | ... | 8 | 5+1=6 | 6/8=75 | 37.5 |
| GRADEPOINTCHK | ... | ... | 7 | 6+1=7 | 7/7=100 | 57.1 |

COMPONENT INFORMATION

| COMPONENT ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| EMP0120GRD | ... | ... | 11 | 8+1=9 | 7 | 9/11=81.8 | 63.6 |
| EMP0130SCH | ... | ... | 35 | 27 | 8 | 77.1 | 22.9 |

FIG. 11D

S7 - AFTER NORMAL TERMINATION OF PROCESS
METHOD INFORMATION

| METHOD ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| GRADEPOINTCAL | ... | ... | 8 | 6 | 3+1=4 | 75 | 4/8=50 |
| GRADEPOINTCHK | ... | ... | 7 | 7 | 4+1=5 | 100 | 5/7=71.4 |

COMPONENT INFORMATION

| COMPONENT ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| EMP0120GRD | ... | ... | 11 | 9 | 7+1=8 | 81.8 | 8/11=72.7 |
| EMP0130SCH | ... | ... | 35 | 27 | 8 | 77.1 | 22.9 |

FIG. 12A (EXAMPLE 3) WHEN SAME ONE METHOD IS DEFINED IN SAME ONE COMPONENT FOR ACTION OF TWO ITEMS ON SCREEN
ACTION COMPONENT INFORMATION  24

| SCREEN ID | ITEM ID | METHOD ID | METHOD NAME | SETTING SECTION | ...... |
|---|---|---|---|---|---|
| TKY01001 | BTNGRADECAL1 | GRADEPOINTCAL | CALCULATING EVALUATION POINT | EXTRACTION | ... |
| TKY01001 | BTNGRADECAL2 | GRADEPOINTCHK | EVALUATION POINT CHECK | EXTRACTION | ... |
| TKY01001 | LNKPOSTNUM | POSTNUMSCH | RETRIEVING POSTCODE | NEW ENTRY | ... |

FIG. 12B

S4 - AFTER NORMAL TERMINATION OF PROCESS
METHOD INFORMATION

| METHOD ID | ...... | FREQUENCY OF USE | ...... | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|---|
| GRADEPOINTCAL | ... | 7+2=9 | ... | 5 | 3 | 5/9=55.6 | 3/9=33.3 |
| GRADEPOINTCHK | ... | 6 | ... | 6 | 4 | 6/6=100 | 4/6=66.7 |

COMPONENT INFORMATION

| COMPONENT ID | ...... | FREQUENCY OF USE | ...... | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|---|
| EMP0120GRD | ... | 10+2=12 | ... | 8 | 7 | 8/12=66.7 | 7/12=58.3 |
| EMP0130SCH | ... | 35 | ... | 27 | 8 | 27/35=77.1 | 8/35=22.9 |

FIG. 12C

S6 - AFTER NORMAL TERMINATION OF PROCESS
METHOD INFORMATION

| METHOD ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| GRADEPOINTCAL | ... : ... | | 9 | 5+2=7 | 7/9=77.8 | 33.3 |
| GRADEPOINTCHK | ... : ... | | 6 | 6 | 100 | 66.7 |

COMPONENT INFORMATION

| COMPONENT ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| EMP0120GRD | ... : ... | | 12 | 8+2=10 | 10/12=83.3 | 58.3 |
| EMP0130SCH | ... : ... | | 35 | 27 | 77.1 | 22.9 |

FIG. 12D

S7 - AFTER NORMAL TERMINATION OF PROCESS
METHOD INFORMATION

| METHOD ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| GRADEPOINTCAL | ... : ... | | 9 | 7 | 77.8 | 5/9=55.6 |
| GRADEPOINTCHK | ... : ... | | 6 | 6 | 100 | 66.7 |

COMPONENT INFORMATION

| COMPONENT ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| EMP0120GRD | ... : ... | | 12 | 10 | 83.3 | 7+2=9 |
| EMP0130SCH | ... : ... | | 35 | 27 | 77.1 | 9/12=75 |

FIG. 13A (EXAMPLE 4) WHEN DIFFERENT METHOD IS DEFINED IN SAME ONE COMPONENT FOR ACTION OF TWO ITEMS ON SCREEN

ACTION COMPONENT INFORMATION

| SCREEN ID | ITEM ID | METHOD ID | METHOD NAME | SETTING SECTION | ⋯ |
|---|---|---|---|---|---|
| TKY01001 | BTNGRADECAL | GRADEPOINTCAL | CALCULATING EVALUATION POINT | EXTRACTION | ⋯ |
| TKY01001 | BTNGRADECHK | GRADEPOINTCHK | EVALUATION POINT CHECK | EXTRACTION | ⋯ |
| TKY01001 | LNKPOSTNUM | POSTNUMSCH | RETRIEVING POSTCODE | NEW ENTRY | ⋯ |

(arrow points to SETTING SECTION column labeled 24)

FIG. 13B

S4 — AFTER NORMAL TERMINATION OF PROCESS

METHOD INFORMATION

| METHOD ID | ⋯ | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| GRADEPOINTCAL | ⋯ | 7+1=8 | 5 | 3 | 5/8=62.5 | 3/8=37.5 |
| GRADEPOINTCHK | ⋯ | 6+1=7 | 6 | 4 | 6/7=85.7 | 4/7=57.1 |

COMPONENT INFORMATION

| COMPONENT ID | ⋯ | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| EMP0120GRD | ⋯ | 10+2=12 | 8 | 7 | 8/12=66.7 | 7/12=58.3 |
| EMP0130SCH | ⋯ | 35 | 27 | 8 | 77.1 | 22.9 |

FIG. 13C

S6 - AFTER NORMAL TERMINATION OF PROCESS
METHOD INFORMATION

| METHOD ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| GRADEPOINTCAL | ..... | 8 | 5+1=6 | 3 | 6/8=75 | 33.3 |
| GRADEPOINTCHK | ..... | 7 | 6+1=7 | 4 | 7/7=100 | 66.7 |

COMPONENT INFORMATION

| COMPONENT ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| EMP0120GRD | ..... | 12 | 8+2=10 | 7 | 10/12=83.3 | 58.3 |
| EMP0130SCH | ..... | 35 | 27 | 8 | 77.1 | 22.9 |

FIG. 13D

S7 - AFTER NORMAL TERMINATION OF PROCESS
METHOD INFORMATION

| METHOD ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| GRADEPOINTCAL | ..... | 8 | 6 | 3+1=4 | 75 | 4/8=50 |
| GRADEPOINTCHK | ..... | 7 | 7 | 4+1=5 | 100 | 5/7=71/4 |

COMPONENT INFORMATION

| COMPONENT ID | ... | FREQUENCY OF USE | FREQUENCY OF AUTOMATIC GENERATION | FREQUENCY OF OPERATION ENVIRONMENT ARRANGEMENT | AUTOMATIC GENERATION RATE (%) | OPERATION ENVIRONMENT ARRANGEMENT RATE (%) |
|---|---|---|---|---|---|---|
| EMP0120GRD | ..... | 12 | 10 | 7+2=9 | 83.3 | 9/12=75 |
| EMP0130SCH | ..... | 35 | 27 | 8 | 77.1 | 22.9 |

PROGRAM, PROGRAM CONSTRUCTION METHOD, STORAGE MEDIUM, PROGRAM CONSTRUCTION SYSTEM, AND TERMINAL DEVICE

BACKGROUND OF THE INVENTION

1. Field of the Invention

The present invention relates to a program construction method, a storage medium, a program construction system, and a terminal device, and more specifically to the effective technology applied to a program constructing technology, etc. by reuse of a functional unit which is a component of a program.

2. Description of the Related Art

With improvement in the performance of computer systems remarkably improved, implemented computer programs grow in size, and therefore the improvement of development efficiencies is demanded.

Normally, a program is configured by a plurality of functional units (components), and the investigation of the productivity of software has long been made on the reuse of these components. However, since the number of combination patterns of the components is proportional to the power of the number of components, productivity can be enhanced with reusability improved to some extent in a specific application system development by a small number of project members. However, in a large organization or company, differences in personal skills, property, and concepts, and the complicated systems to be developed interfere with the improvement of productivity by reusing the program components generated by other persons.

For example, with an increasing range of reusing components, the reliability and identity of the components generated by other persons and organizations become more and more uncertain, and the idea of reusing the components is considered with much hesitation, thereby obstructing effective progress of reusing components.

That is, when program components are reused, it is common that each component is retrieved using a keyword as described in Patent Literature 1, but a keyword only cannot obtain the information about the reliability, etc. of the component, and it is hard to select and reuse an appropriate component, or improve the quality or reuse.

Patent Literature 1: Japanese Patent Application Laid-open No. Hei 10-222357

SUMMARY OF THE INVENTION

The present invention aims at providing a program constructing technology capable of accelerating the reuse of a functional unit when a program is constructed by combining a plurality of functional units.

The present invention also aims at providing a program constructing technology capable of constructing a highly reliable program.

The first aspect of the present invention is to provide a signal for carrying a program to allow a computer which performs the process of constructing a program by combining a plurality of functional units to realize: a function of storing in the first database the functional units together with diverted use information about the functional units; a function of displaying the diverted use information about the functional units when the functional unit corresponding to the design information in the second database storing the design information about the program is selected from the first database; and a function of reflecting the use record of the selected functional unit on the diverted use information in the first database.

The second aspect of the present invention is to provide a program construction method of constructing a program by combining a plurality of functional units, and include: a step of storing in the first database the functional units together with diverted use information about the functional units; a step of displaying the diverted use information about the functional units when the functional unit corresponding to the design information in the second database storing the design information about the program is selected from the first database; and a step of reflecting the diverted use information of the selected functional unit on the diverted use information in the first database.

The third aspect of the present invention is to provide a computer-readable storage medium storing a program of constructing a program by combining a plurality of functional units for executing: a step of storing in the first database the functional units together with diverted use information about the functional units; a step of displaying the diverted use information about the functional units when the functional unit corresponding to the design information in the second database storing the design information about the program is selected from the first database; and a step of reflecting the use record of the selected functional unit on the diverted use information in the first database.

The fourth aspect of the present invention is to provide a program construction system for constructing a program by combining a plurality of functional units, and the functional units include: a storage device storing diverted use information about the functional units together with the first database; and a terminal device having the control function for performing: a process of storing in the first database the functional units together with diverted use information about the functional units; a process of displaying the diverted use information about the functional units when the functional unit corresponding to the design information in the second database storing the design information about the program is selected from the first database; and a process of reflecting the use record of the selected functional unit on the diverted use information in the first database.

The fifth aspect of the present invention is to provide a terminal device connected to the storage device storing the first database storing a plurality of functional units used in constructing a program together with the management information about the functional units, and having the controlling function for performing: a process of storing in the first database the functional units together with diverted use information about the functional units; a process of displaying the diverted use information about the functional units when the functional unit corresponding to the design information in the second database storing the design information about the program is selected from the first database; and a process of reflecting the use record of the selected functional unit on the diverted use information in the first database.

The sixth aspect of the present invention is to provide a storage device configuring a program construction system of constructing a program by combining a plurality of functional units and storing the first database storing the plurality of functional units together with diverted use information about the functional units.

According to the above-mentioned present invention, when functional units are reused, based on the use record of the functional units as a reliability level, for example, a functional unit having a sufficient past use record, that is, a reliable functional unit is appropriately selected and reused, thereby improving the reuse process.

Since a program is constructed by reusing a reliable functional unit having a sufficient use record, the reliability of a program can be enhanced.

BRIEF DESCRIPTION OF THE DRAWINGS

FIGS. 3A and 3B show the concept of an example a reusable component repository;

FIGS. 4A, 4B, 4C, and 4D show the concept of an example a program information repository;

FIG. 5 shows the concept of an example of the screen action component definition screen presented to an operator as a screen input/output information defining function;

FIG. 6 shows the concept of an example of a component retrieval screen;

FIGS. 10A, 10B, 10C, and 10D show an example of the progress of the update of the reusable component repository;

FIGS. 11A, 11B, 11C, and 11D show an example of the progress of the update of the reusable component repository;

FIGS. 12A, 12B, 12C, and 12D show an example of the progress of the update of the reusable component repository;

FIGS. 13A, 13B, 13C, and 13D show an example of the progress of the update of the reusable component repository;

DESCRIPTION OF THE PREFERRED EMBODIMENTS

The embodiments of the present invention are described below by referring to the attached drawings.

Figure 1:
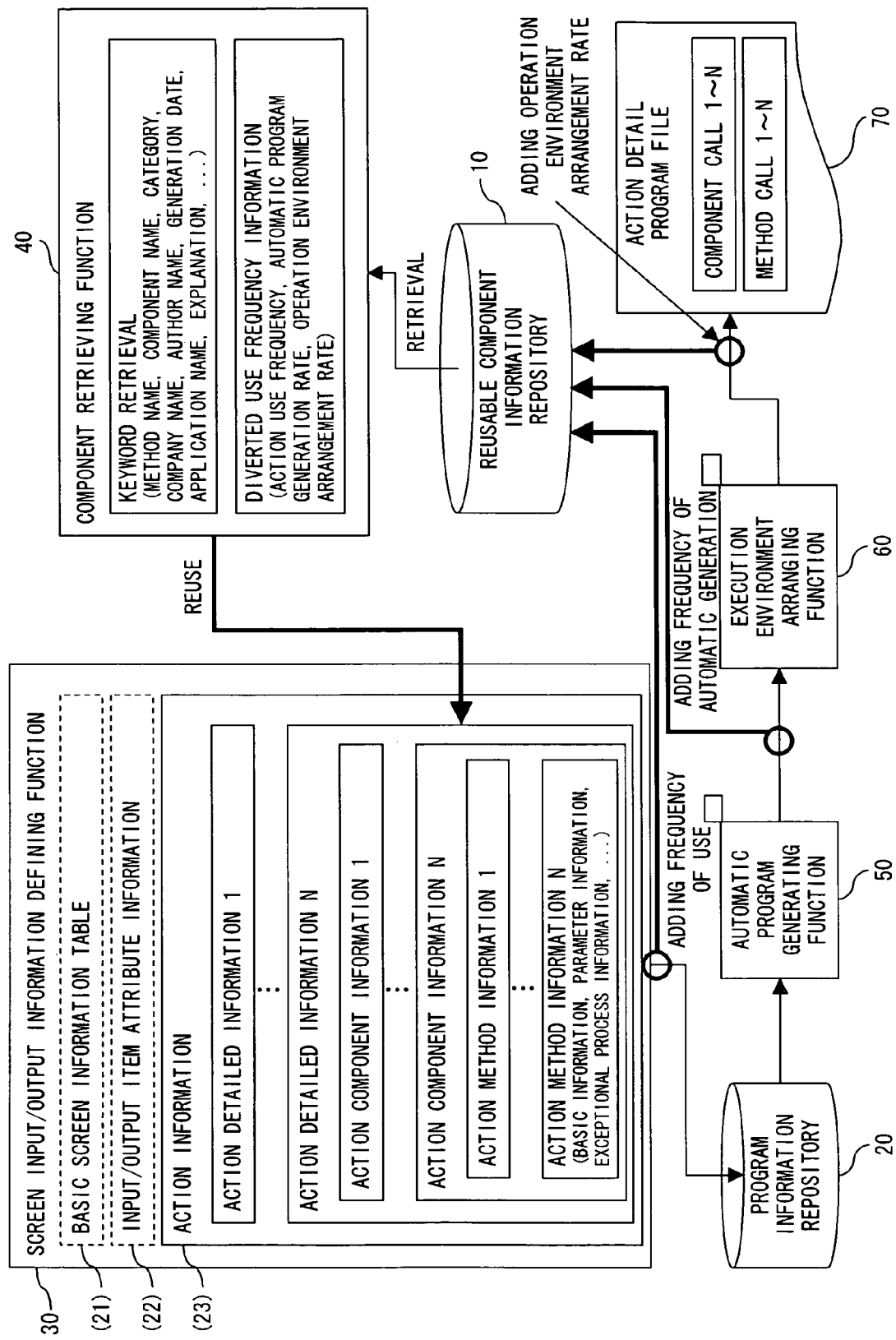
FIG. 1 shows the concept of an example of the operation of the program construction system embodying the program construction method according to an embodiment of the present invention.
Figure 2:
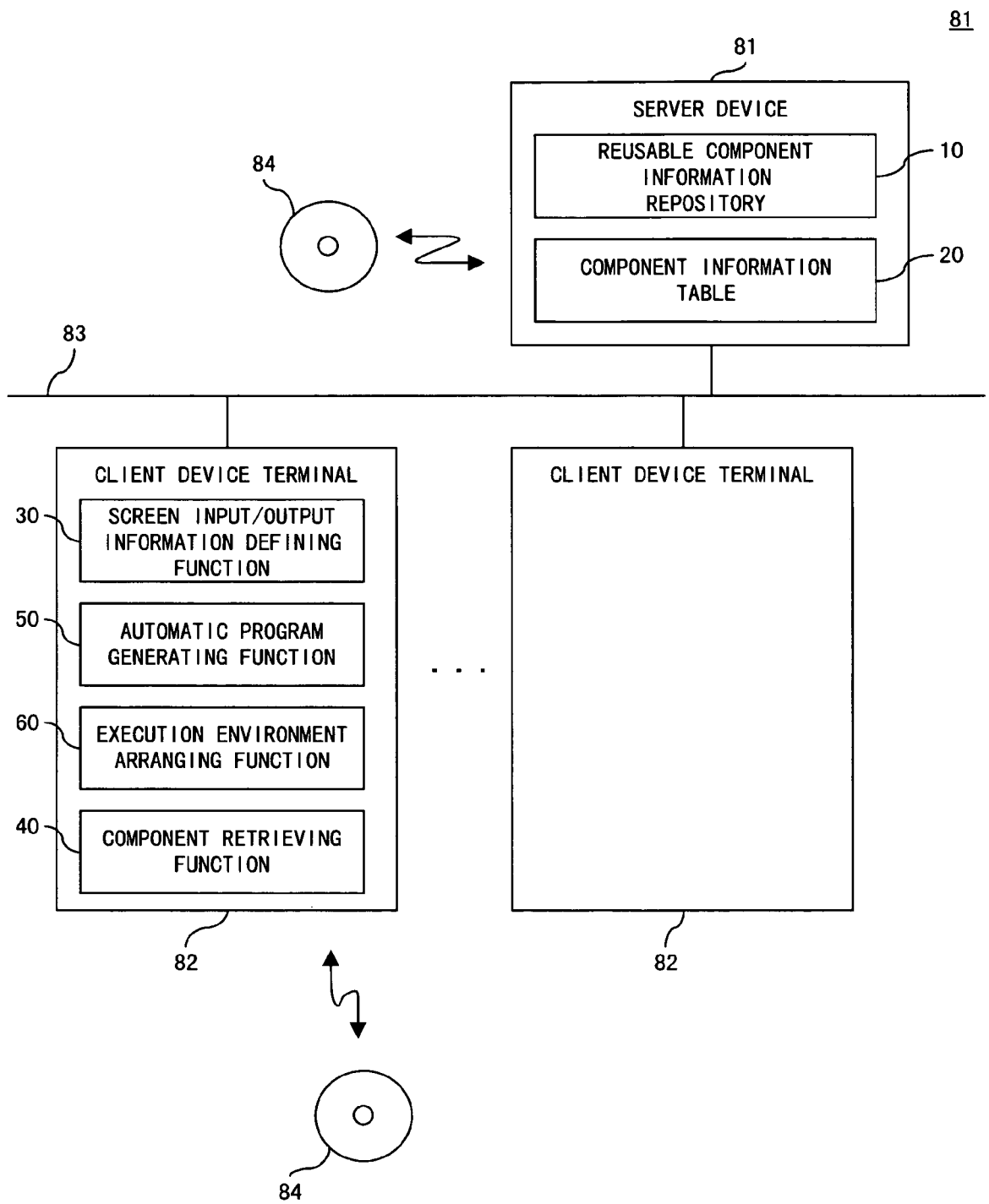
FIG. 2 shows the concept of an example of the system configuration.

FIG. 1 shows the concept of an example of the operation of the program construction system embodying the program construction method according to an embodiment of the present invention. FIG. 2 shows the concept of an example of the system configuration.

The program construction system according to the present embodiment is configured by a server device 81 comprising a computer system, and a plurality of client devices 82 (terminal devices) which are connected to the server device 81 (storage device) through an information network 83, and each of which comprises a computer system.

The server device 81 stores a reusable component information repository 10 (first database) and a program information repository 20 (second database), which can be accessed by each client device 82 through the information network 83.

Each of the client devices 82 implements a screen input/output information defining function 30, a component retrieving function 40, an automatic program generating function 50, an execution environment arranging function 60, etc. and the information described later such as the reusable component information repository 10, the program information repository 20, etc. as software comprising a computer program and data processed by a computer.

The software is distributed after being stored in a storage medium 84 readable by a computer system configuring the server device 81 and the client device 82, and is implemented in the server device 81 and the client device 82 as necessary. Otherwise, the above-mentioned software can be implemented in the server device 81 and the client device 82 from an external global information network such as the Internet, etc. through the information network 83.

For example, the reusable component information repository 10 stores, for example, the program parts such as components and the data collected and accumulated for reuse in the reusable component information repository 10 from a wide range exceeding a size of an organization such as a company, a department, etc. and a method information table 11 and a component information table 12 for management of them.

As shown in FIG. 3A, the method information table 11 stores a method ID 11*a*, a method name 11*b*, a component ID 11*c* to which a corresponding method belongs, a parameter 11*d* as an argument passed when the method is activated, a frequency of use 11*e* indicating the frequency at which the method is read from the server device 81 to the client device 82, a frequency of automatic generation 11*f* at which the method read from the server device 81 is actually used in the automatic generation, a frequency of operation environment arrangement 11*g* indicating the frequency at which the method is arranged in the actual operation environment through the automatic generation, an automatic generation rate 11*h* indicating the rate of the frequency of automatic generation 11*f* to the frequency of use 11*e*, and an operation environment arrangement rate 11*i* indicating the rate of the frequency of operation environment arrangement 11*g* to the frequency of use 11*e*. Each of them is stored as associated with each method.

As shown in FIG. 3B, the component information table 12 stores information such as a component ID 12*a*, a component name 12*b*, a component type 12*c*, a frequency of use 12*d* indicating the frequency at which the component is read from the server device 81 to the client device 82, a frequency of automatic generation 12*e* indicating the frequency at which the component is actually used in the automatic generation, a frequency of operation environment arrangement 12*f* indicating the frequency at which the component is arranged in the actual operation environment through the automatic generation, an automatic generation rate 12*g* indicating the rate of the frequency of automatic generation 12*e* to the frequency of use 12*d*, and an operation environment arrangement rate 12*h* indicating the rate of the frequency of the operation environment arrangement 12*f* to the frequency of use 12*d*. Each of them is stored as associated with each component.

The program information repository 20 stores information such as a basic screen information table 21, a screen input item attribute table 22, a screen action information table 23, an action component information table 24, etc. shown in FIGS. 4A through 4D.

The basic screen information table 21 shown in FIG. 4A stores information such as a screen ID 21*a*, a screen name 21*b*, a screen configuration 21*c*, etc. as associated with each screen ID 22*a*.

The screen input/output item attribute information table 22 shown in FIG. 4B stores information, such as a screen ID 22*a*, an item ID 22*b*, and an item name ID 22*c*, a type 22*d*, a data type 22*e*, etc., as associated with each item ID 22*b*.

The screen action information table 23 shown in FIG. 4C stores information such as a screen ID 23*a*, an item ID 23*b*, an action type 23*c*, etc. as associated with each screen ID 23*a*.

The action component information table 24 shown in FIG. 4D stores information such as a screen ID 24a, an item ID 24b, a method ID 24c, a method name 24d, and a setting section 24e as associated with each screen ID 24a.

FIG. 5 shows an example of a screen action component definition screen 91 to be presented to an operator in the screen input/output information defining function 30.

The screen action component definition screen 91 includes a menu bar 91a on which each menu item is arranged, a input/output area 91b for inputting the information such as a screen ID, a screen name, an input/output item ID, an input/output item name, etc., a display area 91c for listing methods used on the screen to be currently defined, an update button 91d for reflection (update) of a definition result on the reusable component information repository 10 and the program information repository 20, and a cancel button 91e for cancellation of set contents.

On the "file" menu of the menu bar 91a, the functions of: "fetching a component" for addition of the method selected on the screen and used to the display area 91c by opening the component retrieval screen; "update" for update of the repository with the amended contents; and "cancel" for stopping the process are assigned.

On the "edit" menu, the functions of: "open" for amending the method detailed information by opening the component retrieval screen; "newly add" for amendment of the detailed information about the method by opening the method detailed input screen; and "delete" for deletion of the methods are assigned.

FIG. 6 shows an example of the component retrieval screen 92 presented to an operator in the component retrieving function 40.

A component retrieval screen 92 includes: a check box 92a for designation whether or not a keyword is to be used as retrieval information; a keyword input area 92b for input of a keyword; a check box 92c for designation whether or not a generation date of a generated component is used for the retrieval information; a date information designation area 92d for input of the date information as the retrieval information; a check box 92e for designation whether or not diverted use frequency information (that is, diverted use frequency information such as the frequency of use, the automatic generation rate, the operation environment arrangement rate, etc.) about a component, etc. is used as the retrieval information; a use record threshold designation area 92f for input of the information about the threshold, etc. in retrieval using the diverted use frequency information; a retrieval button 92g for designation of the start of the retrieval; a retrieval result display area 92h for listing retrieval results; a selection button 92i for addition of the method selected from the listing to the used method listing of the screen action component definition screen 91; and a cancel button 92j for stopping the processes, etc.

Described below is an example of an operation of the program construction method according to the present embodiment.

Figure 7:
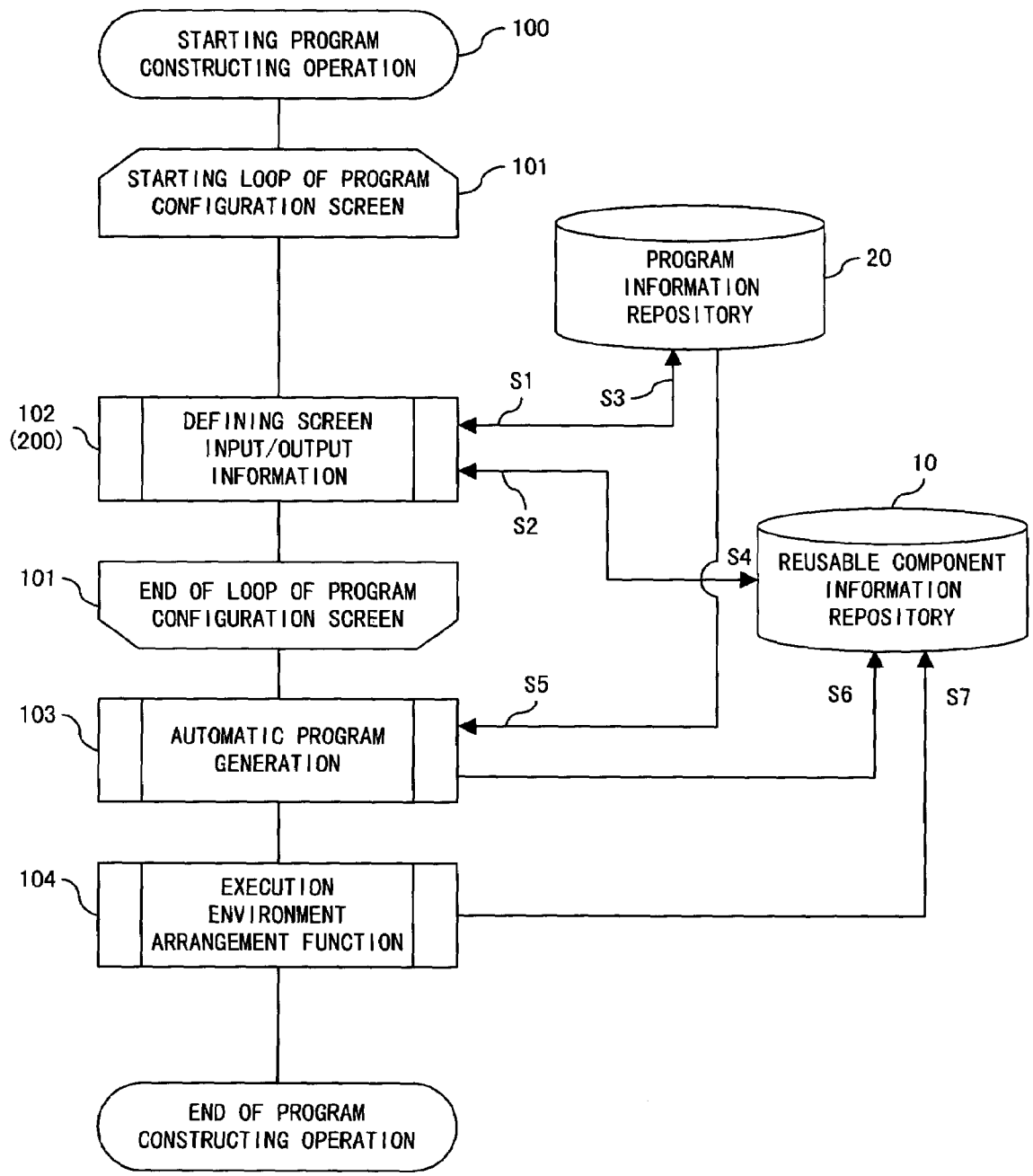
FIG. 7 is a flowchart showing an example of the operation of the program construction method.

As shown in the flowchart in FIG. 7, the operator operating the client device 82 calls the screen input/output information defining function 30 (step 100), uses the screen action component definition screen 91 to access the reusable component information repository 10 and the program information repository 20 on all screens contained in the program to be constructed (processes S1 through S4), and repeats the screen input/output information defining process (step 102).

During the repetition, at the frequency of calling the methods and components called from the reusable component information repository 10 to the screen input/output information defining function 30, the frequency of use 11e of the method information table 11 and the frequency of use 12d of the component information table 12 are updated (process S4).

Then, the automatic program generating function 50 is called, information is read from the program information repository 20 (S5), a program is automatically generated (step 103), and the frequency of automatic generation indicating the frequency of actually using each component and action (method) in the automatic generation is reflected in the frequency of automatic generation 11f and the frequency of automatic generation 12e of the reusable component information repository 10 (process S6).

Then, in step 103, the execution environment arranging function 60 is called, an automatically generated program (source code) is arranged in the execution environment (output to an action detail program file 70) (step 104), the frequency of arrangement of each component and action (method) to an execution environment is reflected in the frequency of operation environment arrangement 11g and the frequency of operation environment arrangement 12f of the reusable component information repository 10 (process S7).

Figure 8:
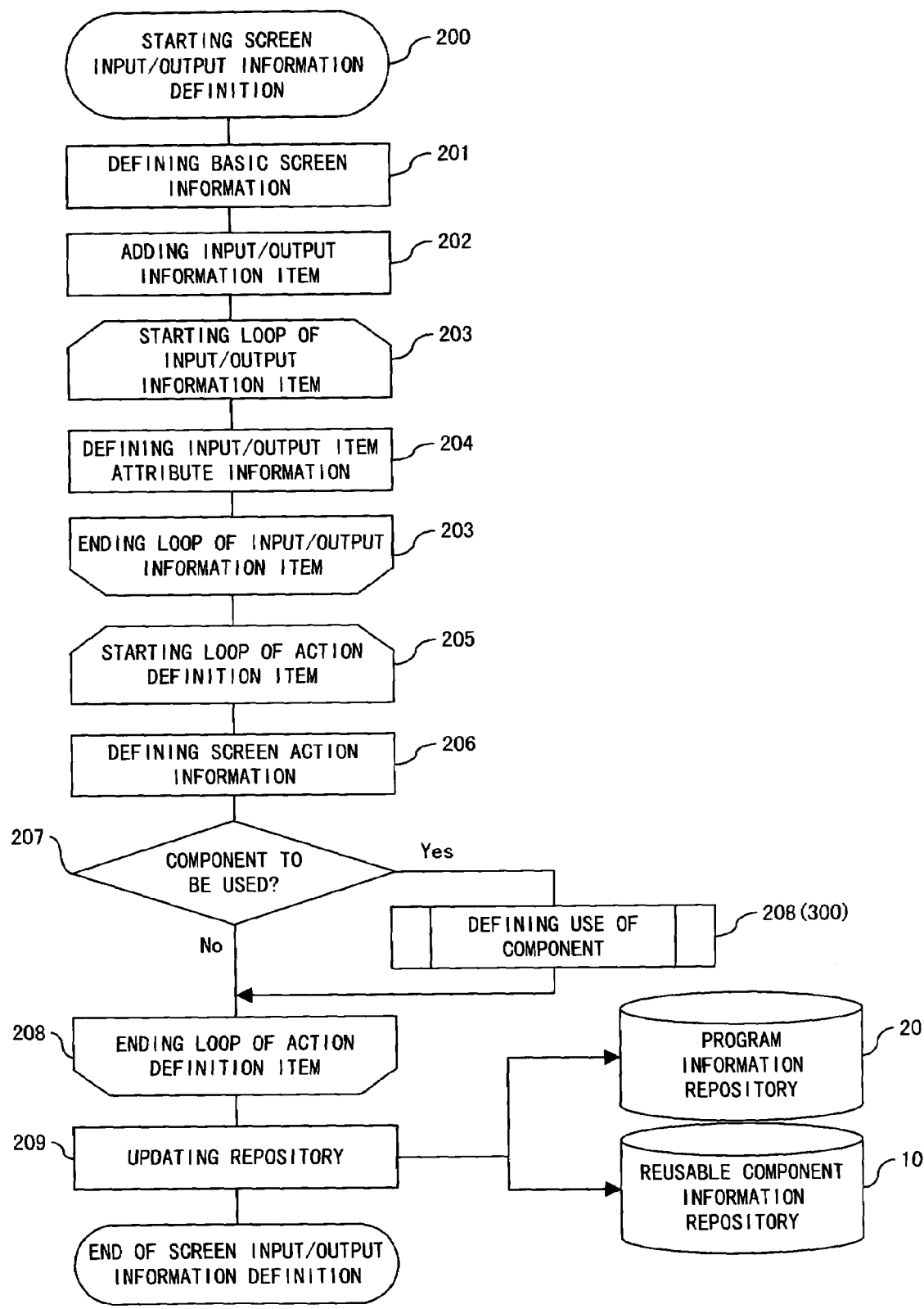
FIG. 8 is a flowchart showing an example of the operation of the program construction method.

As shown in the flowchart in FIG. 8, using the screen action component definition screen 91 in the screen input/output information defining function 30 in step 102, a screen basic information is defined (step 201), an input/output information item is added (step 202), and then the input/output item attribute information defining process (step 204) is repeated by the number of input/output items (step 203).

Furthermore, the definition of the screen action information (step 206), the determination of the presence/absence of the use of a component (step 207), and the definition of the use of a component (step 208) are executed (step 205) by the number of action definition items, and the execution result is reflected in the reusable component information repository 10 and the program information repository 20 (process S3, process S4) (step 209).

Figure 9:
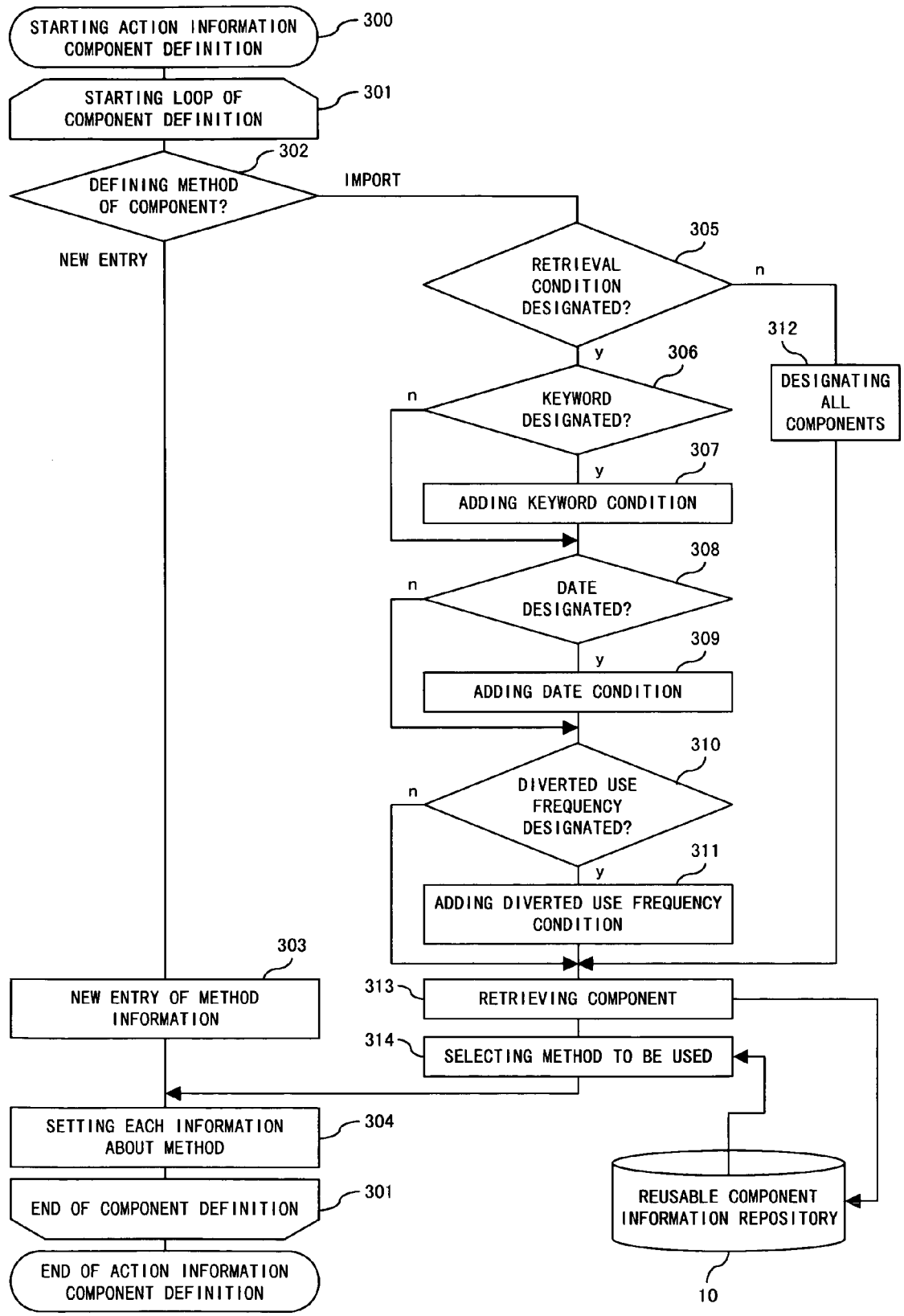
FIG. 9 is a flowchart showing an example of the operation of the program construction method.

As shown in FIG. 9, in the use definition of the component in step 208, the repeating process is started for the number of definitions of the components (step 301), and it is determined whether the component defining method is performed by a new entry or an import (diverting) (step 302).

When it is an import, the component retrieval screen 92 is presented to the operator and allows the operator to input a retrieval condition. Then, the presence/absence of each retrieval condition is determined by the presence/absence of a check in the check box 92a, the check box 92c, and the check box 92e (step 305). If the designation is made, it is determined whether or not there is the designation by a keyword in the check box 92a (step 306). If there is the designation, then the keyword input to the keyword input area 92b is added to the retrieval condition (step 307) and it is determined whether or not there is the designation of a generation date in the check box 92c (step 308). If there is the designation, the date condition of the date information input to the date information designation area 92d is added to the retrieval condition (step 309). It is further determined whether or not there is the diverted use frequency information in the check box 92e (step 310). If there is the designation, the frequency of use, the threshold of each of the automatic generation rate, and the operation environment arrangement rate input to the use record threshold designation area 92f is added to the retrieval condition (step 311).

If there is no designation of the retrieval condition in step 305, the entire components are to be retrieved (step 312).

Using the logical product of the designation conditions of the keyword, the generation date, and the diverted use frequency added to the retrieval condition as a retrieval condition, or using all components as targets, the retrieval of corresponding components is performed on the reusable component information repository 10 (step 313), and the retrieval result is presented to the operator for selection (step 314).

When a new entry is selected in step 302 above, a new entry such as method information, etc. is made (step 303).

Then, the method imported or newly entered as described above is reflected in the screen input/output definition (step 304), thereby terminating the definition of the component.

FIGS. 10A through 10D, 11A through 11D, 12A through 12D, and 13A through 13D show an example of the process of the update of the method information table 11 and the component information table 12 in the above-mentioned sequence of processes.

FIGS. 10A through 10D show the process of the update when one method in one component is defined for the action of one item on the screen.

When the action component information table 24 is set as shown in FIG. 10A, and when the screen input/output information defining process S4 in step 102 in the flowchart shown in FIG. 7 terminates, the frequency of use 11e of the method information table 11 and the frequency of use 12d of the component information table 12 are increased by 1 as shown in FIG. 10B, and the automatic generation rate 11h, the operation environment arrangement rate 11i, the automatic generation rate 12g, and the operation environment arrangement rate 12h are updated correspondingly.

When the automatic program generating process S6 in step 103 terminates, the frequency of automatic generation 11f and the frequency of automatic generation 12e are increased by 1 as shown in FIG. 10C, and the automatic generation rate 11h and the automatic generation rate 12g are updated correspondingly.

When the execution environment arranging process S7 in step 104 terminates, the frequency of operation environment arrangement 11g and the frequency of operation environment arrangement 12f are increased by 1 as shown in FIG. 10D, and the operation environment arrangement rate 11i and the operation environment arrangement rate 12h are updated correspondingly.

Similarly, FIGS. 11A, 11B, 11C, and 11D show the process of the update when two methods in one component are defined for the action of one item on the screen. The respective frequencies of the corresponding components and the two relevant methods are updated.

That is, when the action component information table 24 is defined as shown in FIG. 11A, the contents of the method information table 11 and the component information table 12 are as shown in FIG. 11B after the normal termination of the process S4. After the normal termination of the process S6, the contents of the method information table 11 and the component information table 12 are as shown in FIG. 11C. After the normal termination of the process S7, the contents of the method information table 11 and the component information table 12 are as shown in FIG. 11D.

Similarly, FIGS. 12A, 12B, 12C, and 12D show the process of the update when the same method in the same component is defined for the action of two items on the screen. In this case, the corresponding components and methods are used twice for each item, thereby increasing the frequency of use by 2 and performing necessary update.

That is, when the action component information table 24 is defined as shown in FIG. 12A, the contents of the method information table 11 and the component information table 12 are as shown in FIG. 12B after the normal termination of the process S4. After the normal termination of the process S6, the contents of the method information table 11 and the component information table 12 are as shown in FIG. 12C. After the normal termination of the process S7, the contents of the method information table 11 and the component information table 12 are as shown in FIG. 12D.

Similarly, FIGS. 13A, 13B, 13C, and 13D show the process of the update when different methods in the same component are defined for the action of two items on the screen. In this case, the corresponding components are used twice for each item, thereby increasing the frequency of use of the component by 2, adding 1 to the frequency of use, etc. of the method, and performing necessary update.

That is, when the action component information table 24 is defined as shown in FIG. 13A, the contents of the method information table 11 and the component information table 12 are as shown in FIG. 13B after the normal termination of the process S4. After the normal termination of the process S6, the contents of the method information table 11 and the component information table 12 are as shown in FIG. 13C. After the normal termination of the process S7, the contents of the method information table 11 and the component information table 12 are as shown in FIG. 13D.

As described above, in the program construction method according to the present embodiment, when the existing component and method stored in the reusable component information repository 10 are diverted, the determination as to whether or not a corresponding component and method is to be applied can be made, and the priority of the application can be determined, thereby enhancing the reuse rate of the components by referring to the diverted use frequency information such as the frequency of use of the download of components and methods from the server device 81 to the client device 82, the frequency of automatic generation 11f at which an actual source code has been automatically generated, the frequency of operation environment arrangement indicating the frequency at which they have been incorporated into the actual operation program through compilation, etc., the automatic generation rate and operation environment arrangement rate which are the rates of the frequency of automatic generation and frequency of operation environment arrangement respectively to the frequency of use, etc.

Furthermore, since the actual diverting result is reflected in the method information table 11 and the component information table 12 of the reusable component information repository 10, the reuse rate can be accelerated much more.

That is, when the reuse of components is expected by collecting components, etc. beyond the range of an organization, etc., it has been difficult to evaluate the reliability and effectiveness of a component by the conventional retrieval using a keyword, etc. According to the present embodiment, the component is selected with the past use record of components taken into account, the operator is free of worrying about the identity of the corresponding component, and the reuse rate can be enhanced.

The components indicating a large value of diverted use frequency information such as the above-mentioned frequency of use, the frequency of automatic generation, the frequency of operation environment arrangement, the automatic generation rate, the operation environment arrangement rate, etc. can be regarded as objectively reliable, and the reliability of the program constructed by diverting the components, etc. can also be improved.

According to the present invention, when a program is constructed by combining a plurality of functional units, the reuse of the functional units can be promoted.

Additionally, a highly reliable program can be constructed.

What is claimed is:

1. A program construction method of constructing a program by combining a plurality of functional units, comprising:
   storing in a first database the functional units together with diverted use information indicating reliability based on a use record of each of the functional units;
   displaying on a display screen the diverted use information about a corresponding functional unit when the corresponding functional unit for design information about the program, stored in a second database, is selected from the first database; and
   updating the diverted use information of the corresponding functional unit in the first database, where the diverted use information comprises one or more of:
      an automatic program generation rate indicating a ratio of a frequency at which a program using a functional unit is automatically generated to a total read frequency of the functional unit from the first database; and
      an operation environment arrangement rate indicating a ratio of a frequency at which a compilation is performed and a result is arranged in an execution environment of the program using the functional unit to a total read frequency of the functional unit from the first database.

2. A computer-readable storage medium storing a program that when executed by a processor constructs a program by combining a plurality of functional units using a method comprising:
   storing in a first database the functional units together with diverted use information indicating reliability based on a use record of each of the functional units;
   displaying the diverted use information about a corresponding functional unit when the corresponding functional unit for design information about the program, stored in a second database, is selected from the first database; and
   reflecting a selected use record of the selected functional unit on the diverted use information in the first database, where the diverted use information includes one or more of:
      an automatic program generation rate indicating a ratio of a frequency at which a program using a functional unit is automatically generated to a total read frequency of the functional unit from the first database; and
      an operation environment arrangement rate indicating a ratio of a frequency at which a compilation is performed and a result is arranged in an execution environment of the program using the functional unit to a total read frequency of the functional unit from the first database.

3. A program construction system for constructing a program by combining a plurality of functional units, said program construction system comprising:
   a storage device storing, in a first database, diverted use information indicating reliability based on a use record of each of the functional units together with diverted use information about the functional units, and storing design information of a program in a second database; and
   a terminal device having a control function over storing the functional units together with the diverted use information in the first database, displaying the diverted use information indicating reliability of each of the functional units when one of the functional units is selected from the first database, and reflecting a corresponding use record of the one of the functional units on the diverted use information in the first database, where the diverted use information includes one or more of:
      an automatic program generation rate indicating a ratio of a frequency at which a program using a functional unit is automatically generated to a total read frequency of the functional unit from the first database; and
      an operation environment arrangement rate indicating a ratio of a frequency at which a compilation is performed and a result is arranged in an execution environment of the program using the functional unit to a total read frequency of the functional unit from the first database.

4. A terminal device comprising:
   a storage storing first and second databases, the first database having functional units used in constructing a program together with management information, including diverted use information about the functional units, and the second database storing design information of a program;
   a display screen; and
   a processor generating a display of the diverted use information indicating reliability based on a use record of each of the functional units when a selected functional unit, corresponding to the design information in the second database, is selected from the first database; and reflecting the use record of the selected functional unit on the diverted use information in the first database, where the diverted use information includes one or more of:
      an automatic program generation rate indicating a ratio of a frequency at which a program using a functional unit is automatically generated to a total read frequency of the functional unit from the first database; and
      an operation environment arrangement rate indicating a ratio of a frequency at which a compilation is performed and a result is arranged in an execution environment of the program using the functional unit to a total read frequency of the functional unit from the first database.

5. A storage device configuring a program construction system of constructing a program by combining a plurality of functional units, said storage device comprising:
   memory containing a first database storing the plurality of functional units together with diverted use information indicating reliability based on a use record of each of the functional units, where the diverted use information includes one or more of:
      an automatic program generation rate indicating a ratio of a frequency at which a program using a functional unit is automatically generated to a total read frequency of the functional unit from the first database; and
      an operation environment arrangement rate indicating a ratio of a frequency at which a compilation is performed and a result is arranged in an execution environment of the program using the functional unit to a total read frequency of the functional unit from the first database.

6. The program construction method of claim 1, wherein the diverted use information includes a number of times a component has been imported for use in a new software application from a reusable component information repository.

* * * * *